May 3, 1966  R. K. EGNACZAK ETAL  3,249,354
MULTIPLE SHEET DETECTING DEVICE

Filed Dec. 23, 1963  10 Sheets-Sheet 1

INVENTOR.
RAYMOND K. EGNACZAK
JOHN W. WAGNER
BY

ATTORNEY

INVENTOR.
RAYMOND K. EGNACZAK
JOHN W. WAGNER
BY
ATTORNEY

May 3, 1966  R. K. EGNACZAK ET AL  3,249,354
MULTIPLE SHEET DETECTING DEVICE

Filed Dec. 23, 1963  10 Sheets-Sheet 3

INVENTOR.
RAYMOND K. EGNACZAK
JOHN W. WAGNER
BY

ATTORNEY

May 3, 1966  R. K. EGNACZAK ETAL  3,249,354
MULTIPLE SHEET DETECTING DEVICE
Filed Dec. 23, 1963  10 Sheets-Sheet 4

INVENTOR.
RAYMOND K. EGNACZAK
JOHN W. WAGNER
BY
ATTORNEY

INVENTOR.
RAYMOND K. EGNACZAK
JOHN W. WAGNER
BY
ATTORNEY

United States Patent Office 3,249,354
Patented May 3, 1966

3,249,354
MULTIPLE SHEET DETECTING DEVICE
Raymond K. Egnaczak, Williamson, and John W. Wagner, Penfield, N.Y., assignors to Xerox Corporation, Rochester, N.Y., a corporation of New York
Filed Dec. 23, 1963, Ser. No. 332,585
2 Claims. (Cl. 271—57)

This invention relates in general to a sheet feed mechanism and, in particular, to a multiple sheet detecting device to detect the presence of superposed sheets advanced by a sheet feed mechanism.

More specifically, the invention relates to an improved multiple sheet detecting device that is particularly adapted for use in a sheet feed mechanism to detect the presence of superposed sheets and thereby actuating a sheet diverting mechanism to divert such superposed sheets from the normal path of sheet travel.

It is, therefore, the principal object of this invention to improve multiple sheet detecting devices for detecting superposed sheets advanced by a sheet feed mechanism.

For a better understanding of the invention as well as other objects and further features thereof, reference is had to the following detailed description of the invention to be read in connection with the accompanying drawings, wherein.

Figure 1:
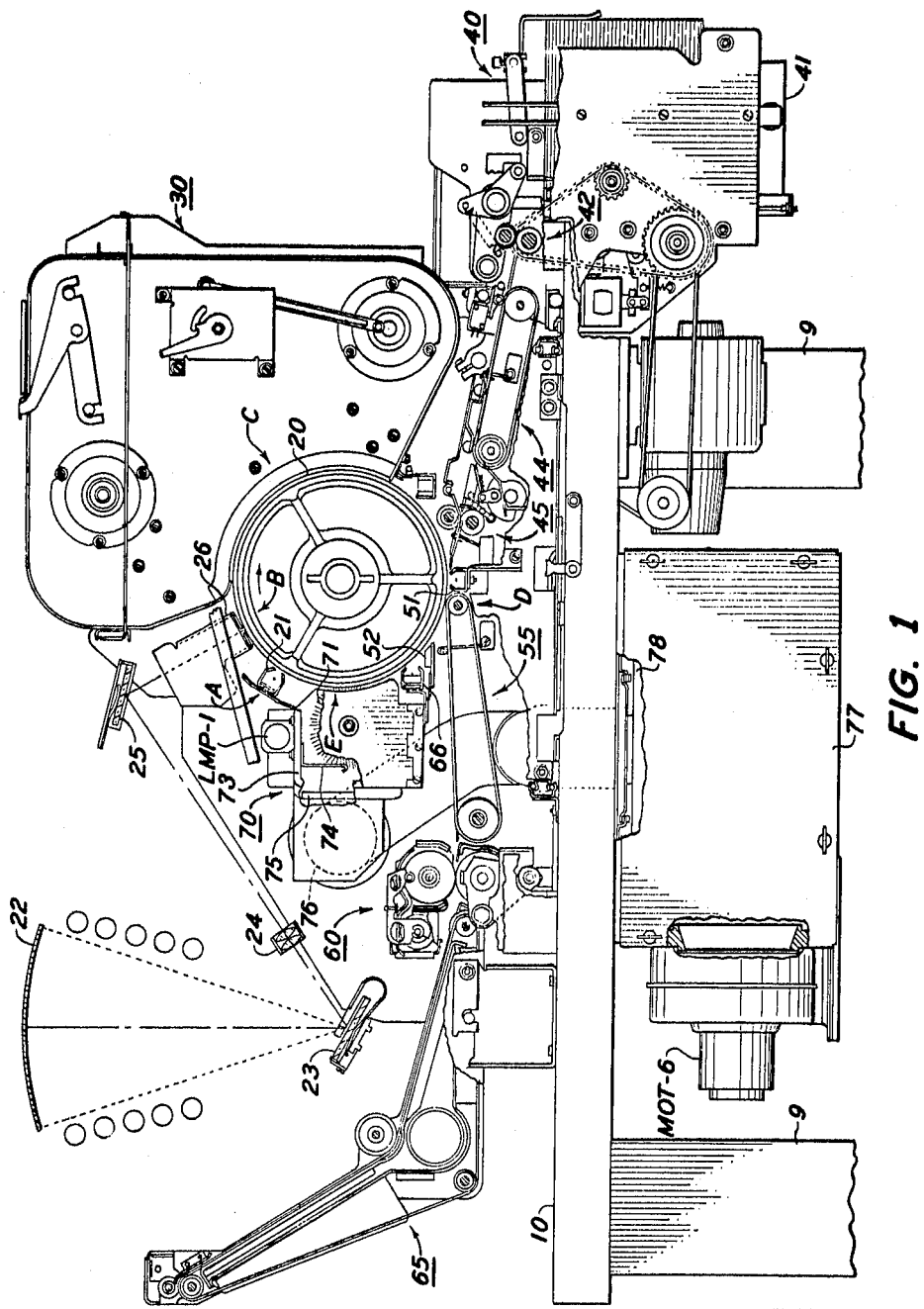
FIG. 1 illustrates schematically a preferred embodiment of a xerographic apparatus having a sheet feed mechanism with a multiple sheet detecting device constructed in accordance with the invention.
Figure 2:
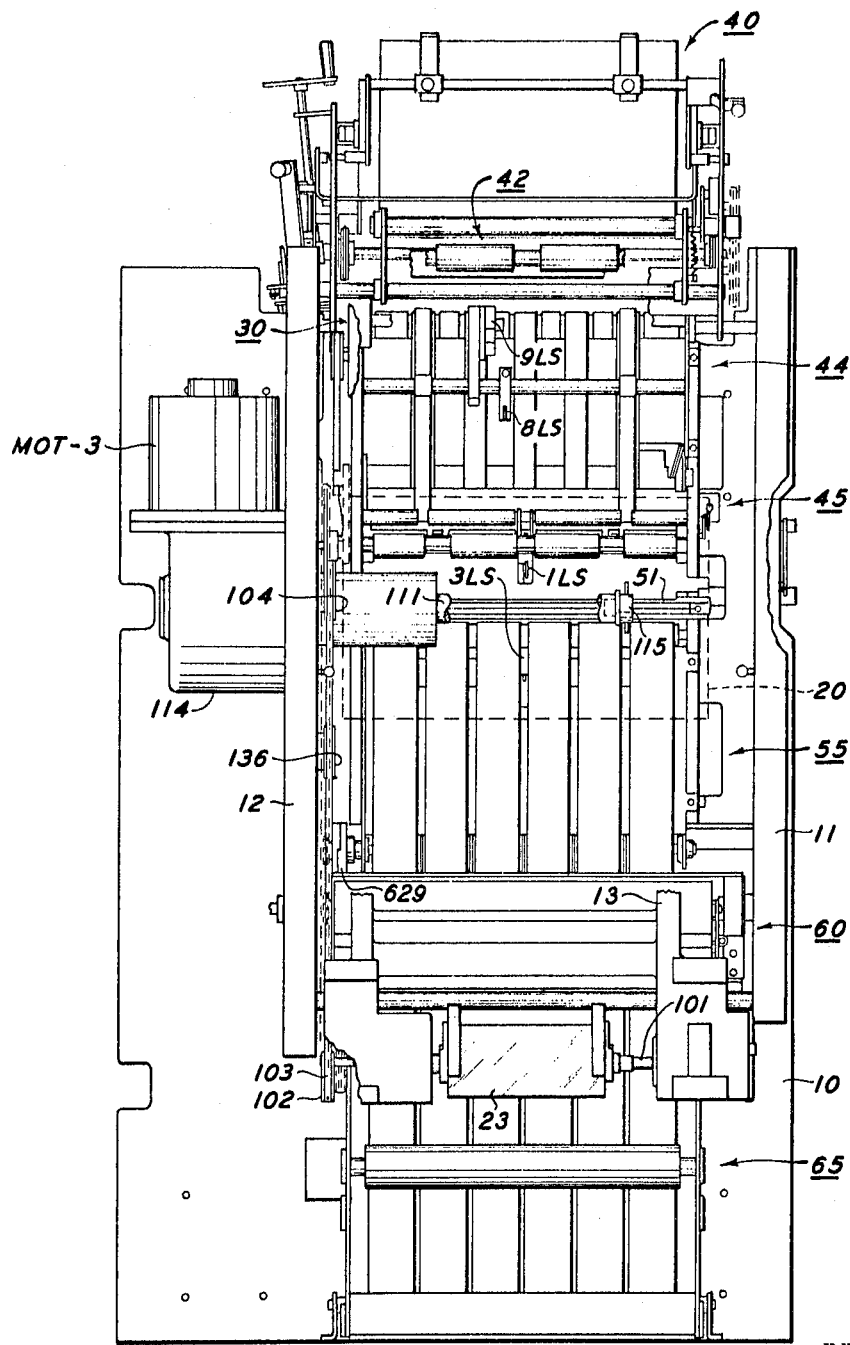
FIG. 2 is a top view of the xerographic apparatus with the xerographic drum, developer assembly and cleaning assembly removed to better illustrate the position of the multiple sheet detecting device.

As shown schematically in FIG. 1, the automatic xerographic reproducing apparatus comprises a xerographic plate 20 including a photoconductive layer or light-receiving surface on a conductive backing and formed in the shape of a drum, which is mounted on a shaft journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station, A, at which a uniform electrostatic charge is deposited on the photoconductive layer of the xerographic drum;

An exposure station, B, at which a light or radiation pattern of copy to be reproduced is projected onto the drum surface to dissipate the drum charge in the exposed areas thereof and thereby form a latent electrostatic image of the copy to be reproduced;

A developing station, C, at which a xerographic developing material including toner particles having an electrostatic charge opposite to that of the electrostatic latent image are cascaded over the drum surface, whereby the toner particles adhere to the electrostatic latent image to form a xerographic powdered image in the configuration of the copy being reproduced;

A transfer station, D, at which the xerographic powder image is electrostatically transferred from the drum surface to a transfer material or a support surface; and, A drum cleaning and discharge station, E, at which the drum surface is brushed to remove residual toner particles remaining thereon after image transfer, and at which the drum surface is exposed to a relatively bright light source to effect substantially complete discharge of any residual electrostatic charge remaining thereon.

Positioned next and adjacent to the developing station is the image transfer station D which includes a sheet feeding arrangement adapted to feed sheets of support material, such as paper or the like successively to the xerographic drum in coordination with the presentation of the developed image on the drum surface at the transfer station.

The sheet feeding mechanism includes a sheet feed device 40 adapted by means of vacuum feeders to feed the top sheet, of a stack of sheets on a tray 41, to a set of feed rollers 42 for advancement by the feed rollers of the sheet to a paper transport 44 which, in turn, conveys the sheet to a sheet registration device 45 positioned adjacent to the xerographic drum. The sheet registration device arrests and aligns each individual sheet of material and then in timed relation to the movement of the xerographic drum, advances the sheet material into contact with the xerographic drum in registration with a previously formed xerographic powder image on the drum.

It is believed that the foregoing description is sufficient for the purposes of this application to show the general operation of the xerographic reproducing apparatus. For further details concerning the specific construction, reference is made to copending Gilbert A. Aser et al. application, Serial No. 332,653 filed concurrently herewith and to portions of this specification wherein specific elements cooperating with the sheet feed mechanism are illustrated and described although they form no part of the instant invention.

Referring now to the drawings, there is provided a frame for supporting the components of the apparatus formed by a base plate 10 supported on legs 9. Vertical outboard and inboard frame plates 11 and 12, respectively, are secured to base plate 10 in spaced relation to each other.

The xerographic drum 20 is mounted on a horizontal driven shaft and the drum is positioned between frames 11 and 12, with the major xerographic components of the machine mounted around the drum.

Paper separated and fed by the sheet feed mechanism 40 is further advanced by a paper transport 44 constructed in accordance with the invention, to a sheet registration device 45 whereat the leading edge of a sheet is aligned and then advanced to the xerographic drum in registration with a previously developed image thereon. Transfer of the developed image on the drum to the sheet of paper is affected electrostatically by corona transfer device 51. After transfer, the sheet is separated from the drum by sheet pick-off device 52, the sheet dropping onto endless conveyor 55 to be forwarded thereby to fuser 60.

In the embodiment of the xerographic apparatus shown, paper transport 44, sheet registration device 45, corona transfer device 51 and endless conveyor 55 are supported on a frame assembly formed as a separate unit from the main frame of the machine. The frame assembly supporting these elements may be moved as a unit away from the xerographic drum to permit access to the paper path.

As shown, the frame assembly includes an outboard frame 501 and an inboard frame 502 held in rigid spaced relation to each other by tie bars 503 which also support one portion of drawer slides 504, the mating portions of which are secured to angle rail supports 505 fastened to the base plate 10 of the main machine frame.

The paper transport 44 includes a transport frame having a guide plate 510 and depending side plates 511 and 512 to support the remaining components of the paper transport.

The side plates 511 and 512 of paper transport 44 are secured to outboard frame 501 and inboard frame 502, respectively, by angle brackets 513, secured to the side plates as by welding, and by screws 514 to the frames.

A plurality of endless belts 521 are looped about an idler roller 522 and a drive roler 523. Idler roller 522 is journaled in bearings 524 positioned in bearing brackets 525 secured to side plates 511 and 512. Drive roller 523 is journaled in bearings 526 retained by the recessed apertured portions of side plates 511 and 512 and held in axial alignment by collars 527. The drive roller is driven by chain 530 engaging sprocket 528 fixed to the inboard end of the drive roller.

The sheets are held in engagement with the belts by ball weights 531 carried in ball retainer brackets 532 and 533 secured to ball carrier bracket 534 supported by spacers 535 and 536 secured to side plates 511 and 512 whereby the ball weights will be in contact with the belts 521 or with a sheet therebetween.

In addition, a paper guide 519 is secured on spacers 536 to prevent the leading edge of a sheet from being deflected as it strikes the actuator of count limit switch 8–LS. Limit switch 8–LS is mounted below guide plate 510 with its actuator extending through a suitable slot in the guide plate into the path of travel of a sheet.

Figure 5:
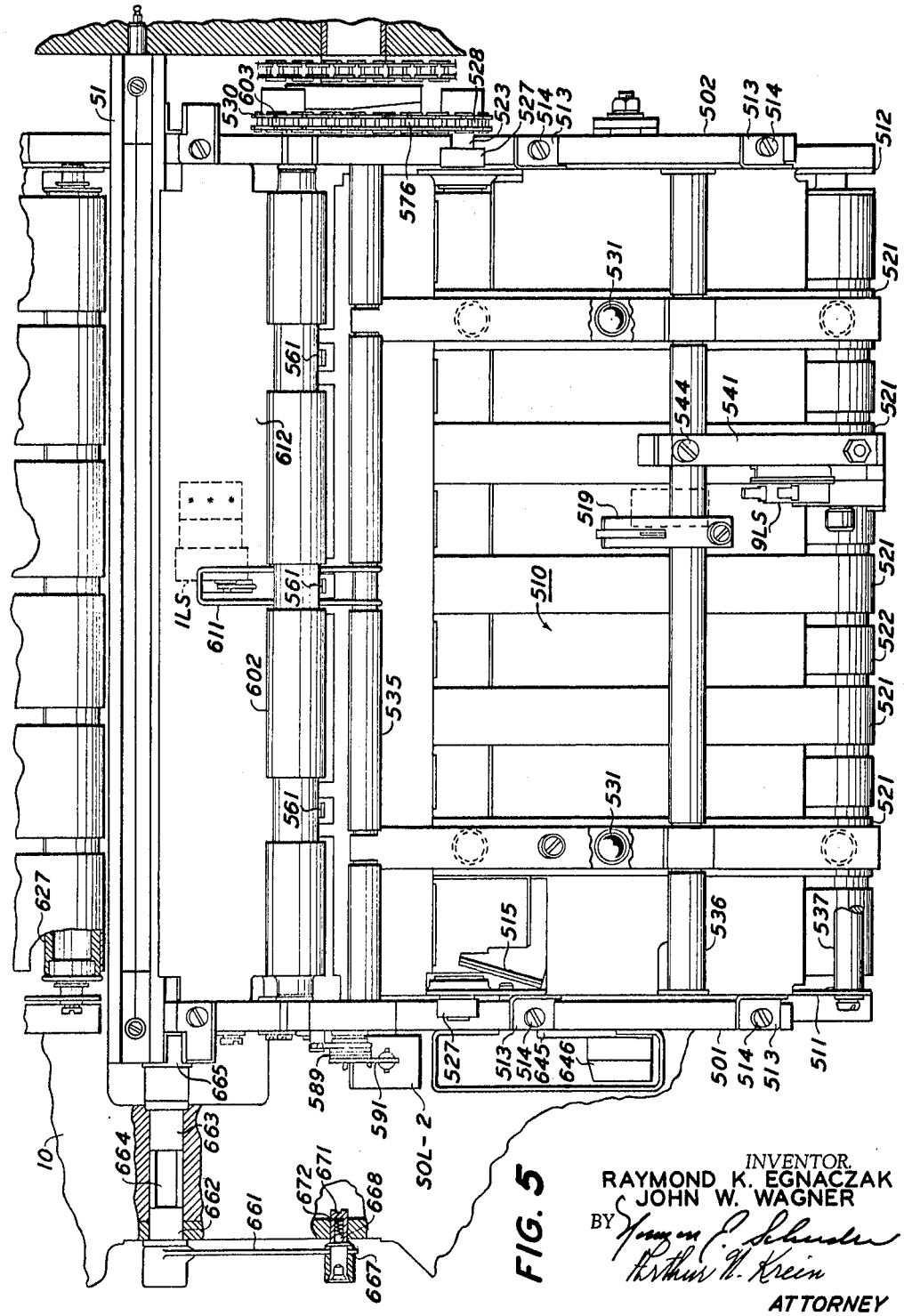
FIG. 5 is a top view of a portion of the paper transport mechanism to the right of the xerographic drum.
Figure 6:
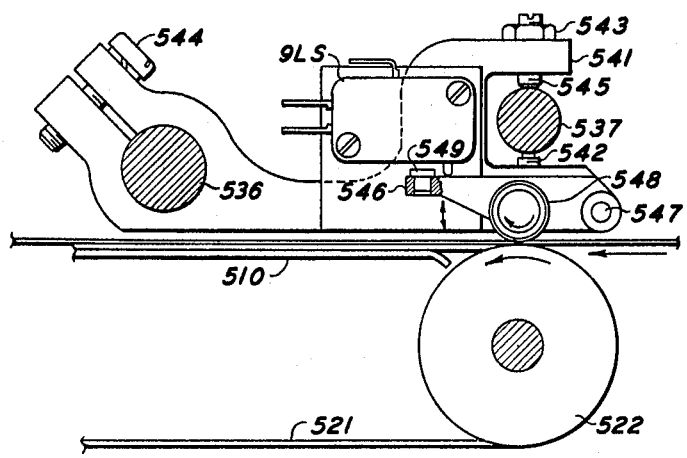
FIG. 6 is an enlarged front view of the double sheet sensing device of the paper transport.
Figure 7:
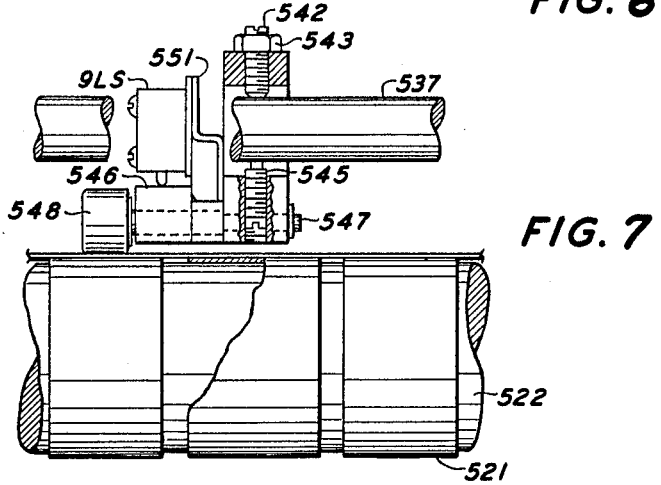
FIG. 7 is a right-hand view of the double sheet sensing device.

To insure alignment of the right hand edge of a sheet, as seen in FIG. 5 against the inboard end of guide plate 510, an edge guide 515 is adjustably secured to the underside of the guide plate by slide plate 516 fastened to guide plate 510 to effect proper side registration by jogging each sheet approximately one-eighth inch. One end of leaf spring 517 is secured to the underside of guide plate 510, the free end of the spring being provided with an aperture to receive ball detent 518 adapted to engage suitably spaced apertures in the edge guide whereby the edge guide can be adjusted for various size sheets.

To prevent delivery of multiple or superposed sheets, a multiple sheet sensing device is used to sense the presence of superposed sheets and thereby control the operation of a diverter to discharge these superposed sheets rather than allowing them to be transported to the drum.

The sheet sensing device includes an adapter arm 541 supported at one end on spacer 536 and at its other end on a spacer rod 537. The adapter arm 541 is adjustable about the axis of spacer 536 whereby the opposite end of the adapter arm can be positioned at a predetermined height or functional setting above one idler roller 522. Adjustment of this height of the adapter arm is effected by screws 542 and 545 threaded in the bifurcated ends of the adapter arm into contact with the spacer 537.

When the adapter arm is correctly positioned, screws 542 are locked into position by nut 543 and then the screw 544 threaded into the opposite end of this arm, is used to lock the adapter arm to spacer 536.

A multifeed sensing limit switch 9LS is mounted on switch bracket 551 secured to adapter arm 541, with the actuator of the limit switch positioned to be actuated by the free end of a pivot arm 546.

The pivot arm 546 is pivotally secured at one end by pin 547 to the adapter arm. Sheet sensing roller 548 is journalled to pivot arm 546 intermediate its ends. A button 549 is fixed to the pivot arm to contact limit switch 9LS before its actuator can be moved sufficiently to damage this switch.

The adapter arm arm is positioned, as previously described, to permit contact between the sensing roller and a single sheet as it is advanced by the belts without causing the operation of the limit switch 9LS, a normally open switch. However, when more than a single sheet passes between the idler roller 522 and the sensing roller, the sensing roller will rise to allow the multiple or superposed sheets to pass and thereby rock the pivot arm sufficiently to actuate the limit switch 9LS to a closed position, for a purpose to be described.

As previously described, the multiple sheet detecting device is used to effect operation of a sheet diverter, which in the apparatus shown, forms part of a sheet registration device, generally identified by reference character 45.

In the normal operation of the sheet feed system, that is, when a single sheet has been separated from the stack and fed to the paper transport, the sheet is advanced toward the drum by the paper transport 44. Single sheets thus advanced are guided by feed table 580 toward another set of feed rollers 601 and 602 which will direct the sheet into contact with the peripheral surface of the xerographic drum. Before the sheet can be advanced into the bite of the feed rollers 601 and 602 its forward progress is stopped by a register stop 561 positioned in front of these feed rollers in the normal paper path.

The register stop 561 is used to align the leading edge of the sheet parallel to the axis of the drum and to restrain the forward progress of the sheet for a short period of time so that the final advancement of the sheet to the drum is timed for proper registration with a developed xerographic image previously formed on the drum.

The register stop 561 is provided at opposite ends with pin 562 journaled in suitable bearings mounted in inboard and outboard frames 502 and 501, respectively. The inboard end of the register stop has a depending portion to which is secured a spring bracket 563 and a cam follower 564. Cam follower 564 is forced into engagement with a cam 571 by means of spring 565 connected at one end to spring bracket 563 and at its opposite end to pin 566 secured to inboard frame 502.

The cam 571 is fixed to shaft 572 suitably journaled in outboard frame 501 and inboard frame 502. This shaft is rotated by means to be described at a speed directly related to the drum speed, which speed is also related to the speed of scanning of an image for projection onto the drum. The register stop is pivoted out of interference relation to a sheet to allow the sheet to be advanced to the drum at a predetermined interval after start of scanning as controlled by the fall of the scan cam and its rate of rotation with respect to the drum.

As shown, shaft 572 is journaled in bearings 573 and 574 mounted in inboard and outboard frames 502 and 501, respectively. A spacer 575 encircles shaft 572 between cam 571 and inboard frame 502, and a sprocket 576 and clutch cam 577 are secured to this end of the shaft.

Referring again to the table feed, generally designated 580, it includes a paper guide portion 581 and a reject gate portion 582 formed integral with each other, and a depending bifurcated portion 583 to slidably receive the grooved pin 586 of actuator lever 587 secured to one end of the stub shaft 588. The feed table is pivotally mounted by pins 584 extending therefrom journaled in suitable bearings mounted in the inboard and outboard frame plates.

Stub shaft 588 journaled in outboard frame 501, has one end of lever 591 secured thereon, the opposite end of the lever being secured by pin 592 to the plunger of solenoid SOL-2 supported by bracket 593 to the outboard frame. Solenoid SOL-2 is suitably connected in an electrical circuit to limit switch LS-9.

Figure 8:
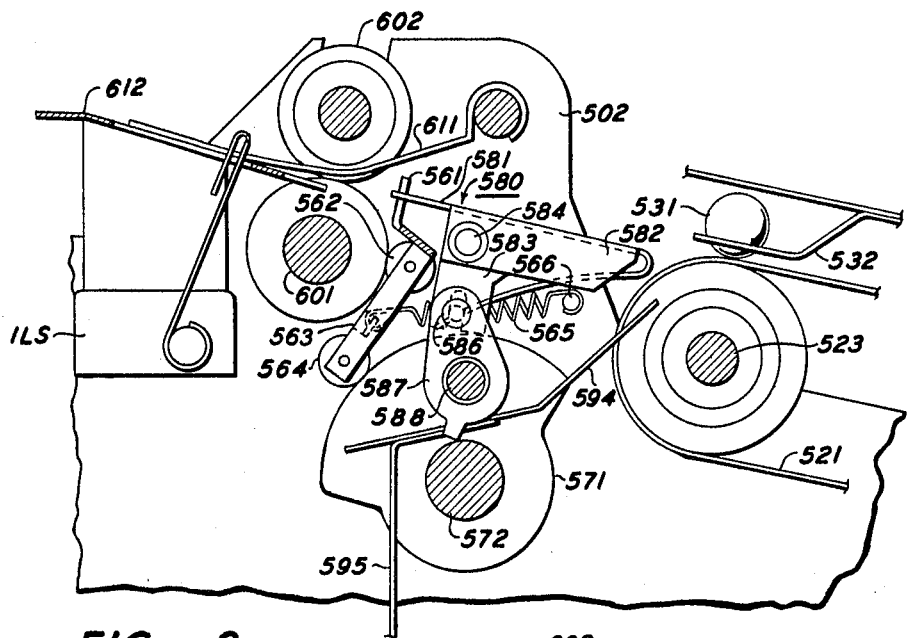
FIG. 8 is an enlarged view with parts broken away of the sheet reject mechanism and the sheet registration mechanism of the paper transport assembly.
Figure 9:
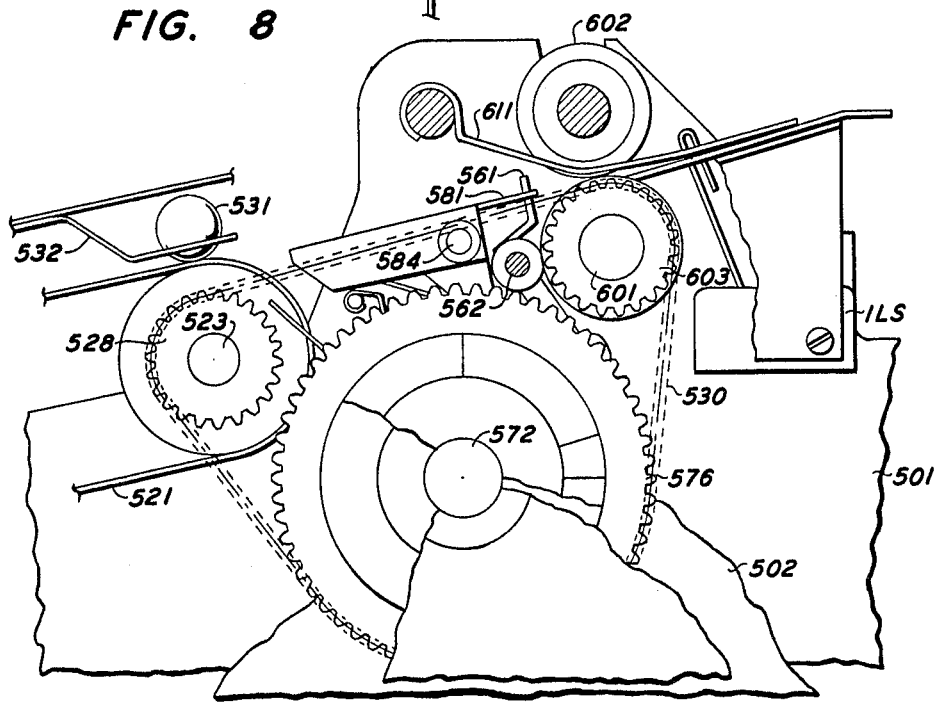
FIG. 9 is a rear view of the paper reject mechanism and the sheet registration mechanism of the paper transport assembly.
Figure 10:
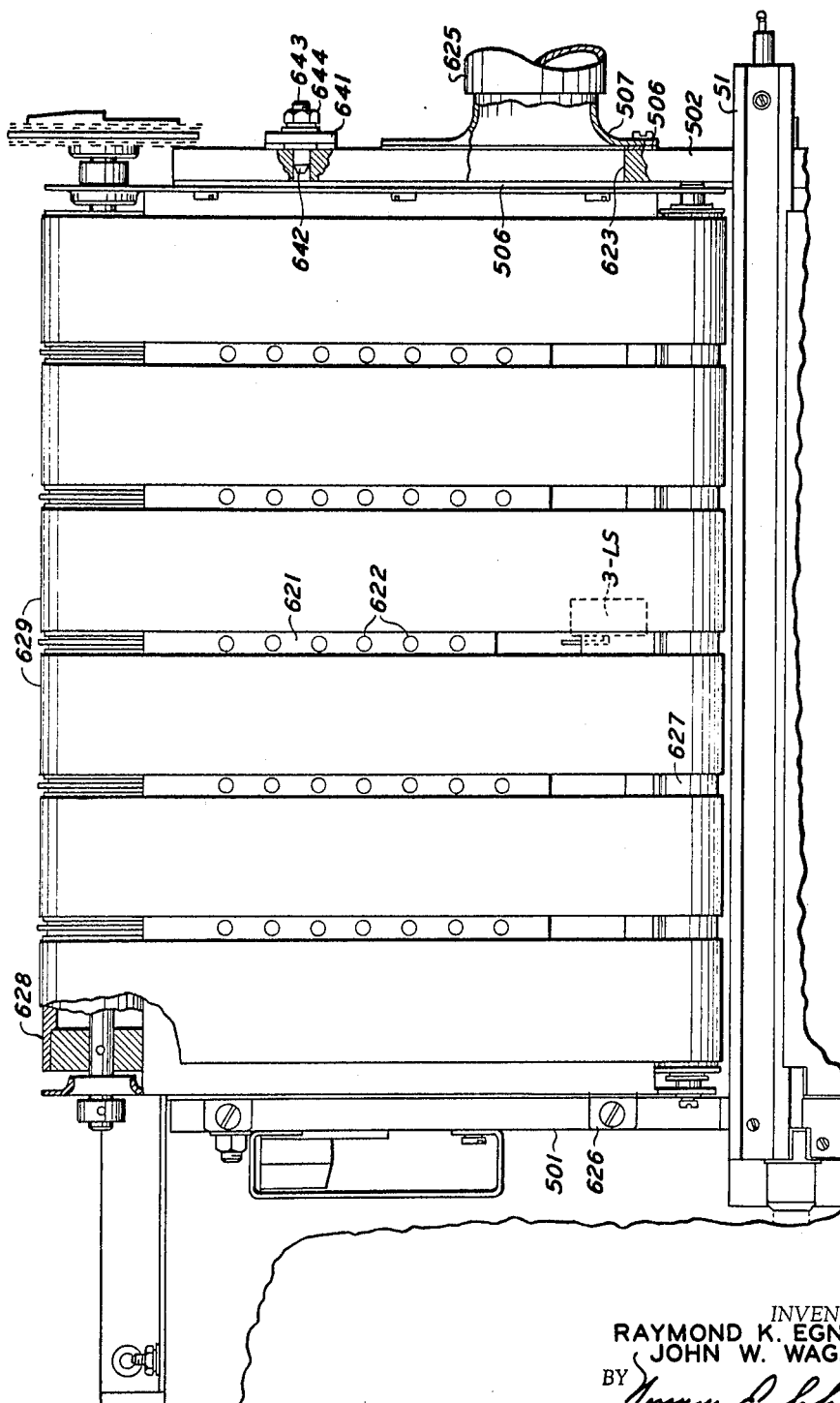
FIG. 10 is a top view of the paper transport assembly for transporting a sheet away from the xerographic drum with the drum removed.
Figure 11:
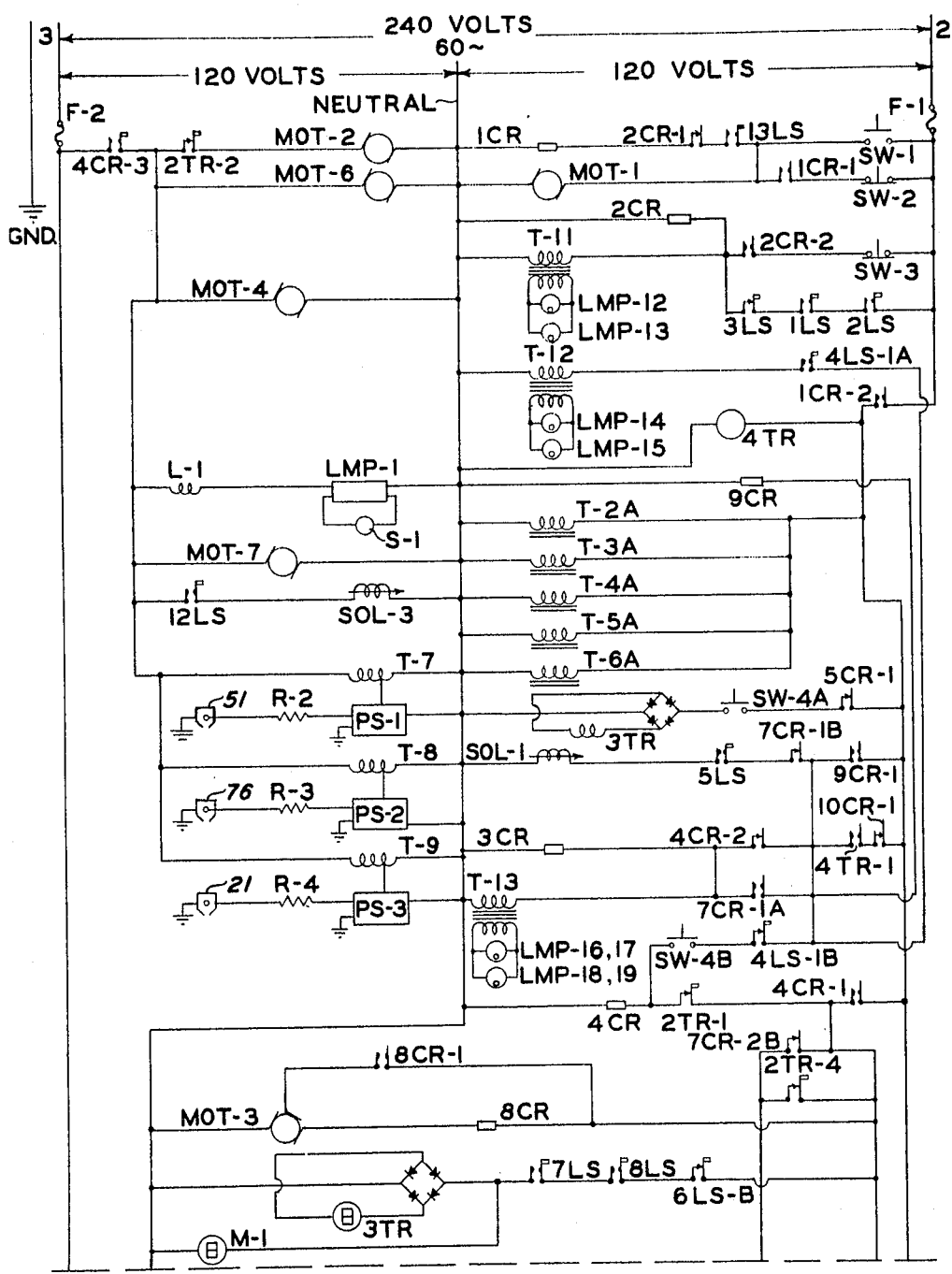
FIGS. 11 and 12 are a schematic electrical wiring diagram of the electrical components of the xerographic apparatus.
Figure 12:
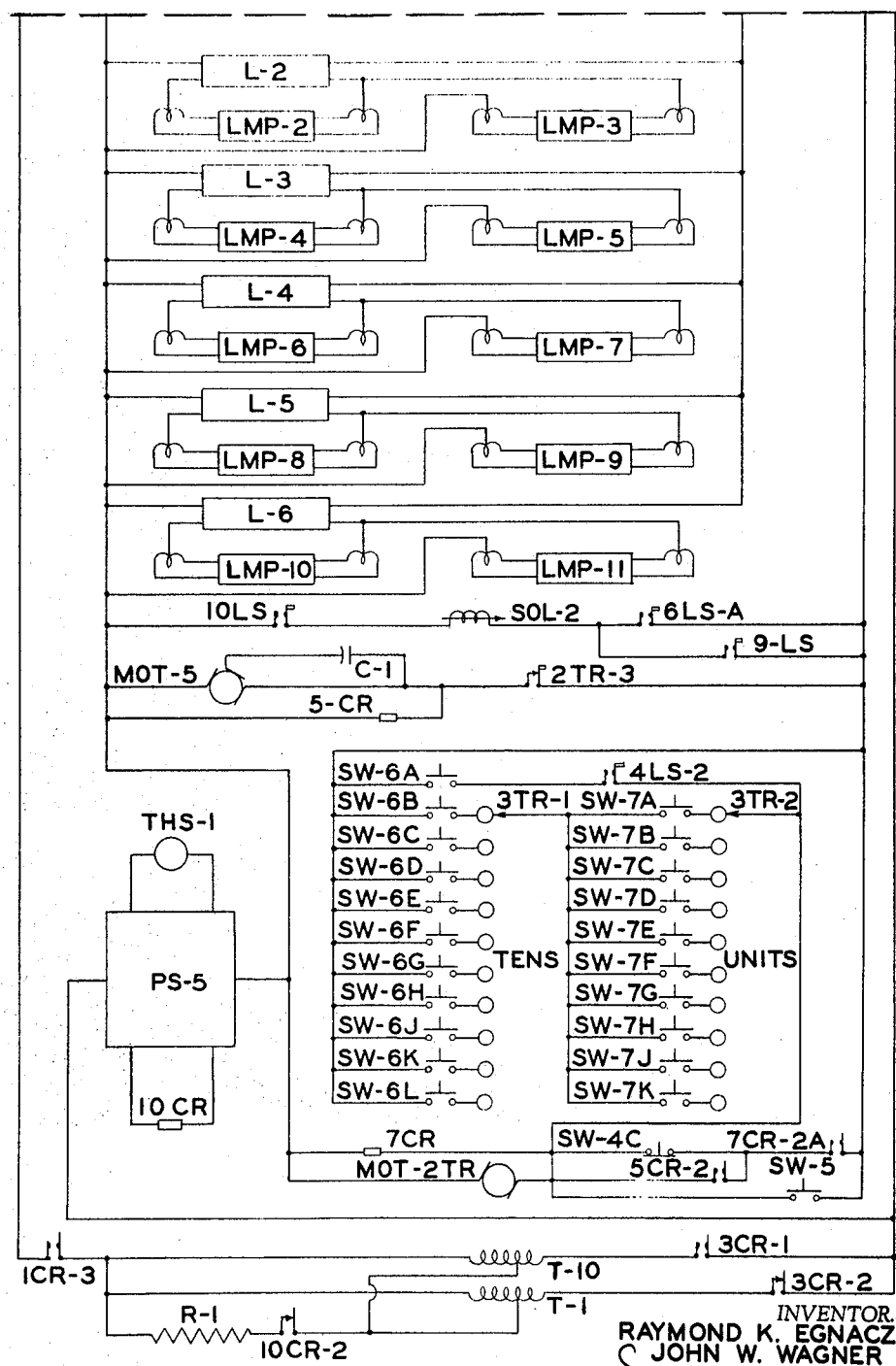

When the solenoid SOL-2 is energized by closure of limit switch 9LS because of the sensing of superposed sheets, it will retract its plunger causing lever 591 and therefore, actuator lever 587 to rotate clockwise, as seen in FIG. 8, thereby causing the feed table 580 to rotate in the opposite direction bringing the reject gate portion into the path of paper travel to deflect the paper downward against paper deflectors 594 and 595 which guide the paper into a paper catch tray 596.

Lever 591 is normally biased in a counterclockwise direction by torsion spring 589 encircling stub shaft 588. One end of the torsion spring is connected to pin 566 in frame 501 and the other end is secured to lever 591.

In the normal operation of single sheet feeding, the forward progress of a sheet is stopped for a very short period of time by the register stop 561, but as this register stop is suddenly lowered out of the path of paper travel, the sheet is advanced to the feed rolls 601 and 602 which firmly feed the sheet between guides 611 and 612 into contact with the drum adjacent corona transfer unit 51.

The feed rolls 601 and 602 are also driven in timed relation with the peripheral speed of the drum. As shown, feed roll 601 is journaled in frames 501 and 502 and is driven by sprocket 603.

Sprocket 603 on the feed roll 601 and sprocket 528 on driven roller 523 of the paper transport are operatively connected by chain 530 to sprocket 576 on shaft 572.

As a sheet is forwarded between guides, the sheet will contact the actuator of a limit switch 1LS suitably supported beneath guide 612.

After transfer, the leading edge of the sheet is separated from the drum by the sheet pick-off mechanism 52, the remainder of the sheet then peeling off the drum due to its own weight to fall onto the belts of endless conveyor 55 which transport the sheet to heat fuser 60.

Endless conveyor 55 includes a transverse extending guide plate 621 secured by angle brackets 626 to frames 501 and 502; a flanged cover 624 is secured as by cam welding to the underside of guide plate 621 forming therewith a vacuum manifold having a number of inlet apertures 622 formed in the guide plate and a discharge connection 623 in communication with a suitable aperture in inboard frame 502 which is connected by vacuum connector 507 and by flexible conduit 625 to a vacuum pump. Suitable gaskets 506 are provided between guide plate 621 and frame 502 and between frame 502 and vacuum connector 507.

Sheets pulled toward the guide plate by suction through inlet apertures 622 are carried by belts 629 looped over idler roller 627 and driven roller 628 suitably journaled in the depending portions of guide plate 621. Driven roller 628 has a cam 629 fixed thereon to be driven in a manner to be described.

A miss detector limit switch 3-LS is secured by a suitable bracket in a position whereby the actuator of the limit switch extends through an aperture in guide plate 621 into the path of paper travel, for a purpose to be described.

As previously described, the frame assembly, carrying paper transport 44 sheet registration device 45, corona transfer device 51 and endless conveyor 55, is slidably mounted by means of drawer slides 504.

To insure proper alignment of these components with the xerographic drum, the brackets 641, secured to base plate 10, are provided with locating pin 542 adapted to engage suitable locating apertures formed in the frame 502.

The outboard frame 501 is aligned vertically by means of bearing plates 645 fixed to this frame and which are adapted to slide onto the locating plates 646 secured to base plate 10 in position to engage the bearing plates as this assembly is pushed parallel to the drum.

Complete withdrawal of this assembly is prevented by suitable stops positioned on the drawer slides 504.

In this position of the assembly, the operator can remove the superposed sheets ejected into catch tray 596. The catch tray is pivotally secured by hinge 651 to a tray support 652 secured to frames 501 and 502, whereby as the assembly is advanced over the edge of base plate 10, the feed out tray will pivot down about hinge 651. As this assembly is again returned to operative relation with respect to the drum, the catch tray is cammed back into sheet receiving position by the cam action of spring support 652, secured to the underside of the catch tray, as it contacts base plate 10.

Figure 3:
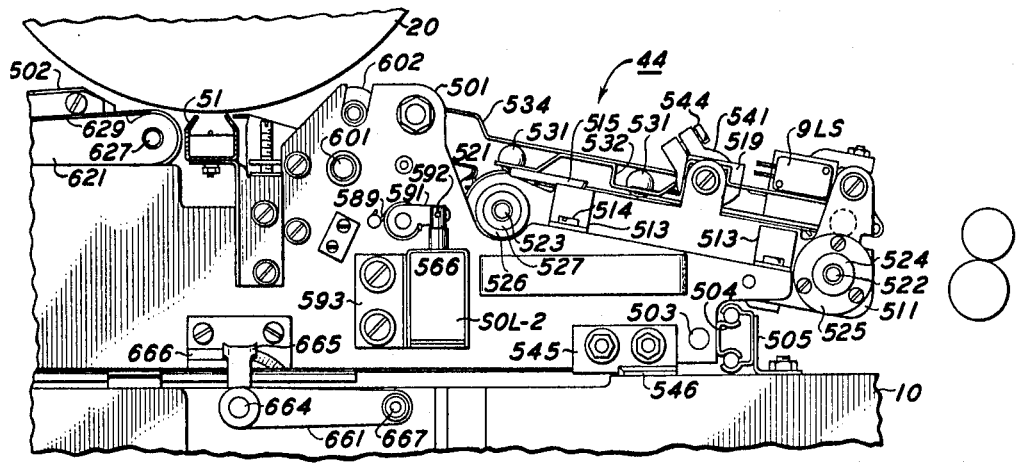
FIG. 3 is a front view of a portion of the paper transport mechanism.
Figure 4:
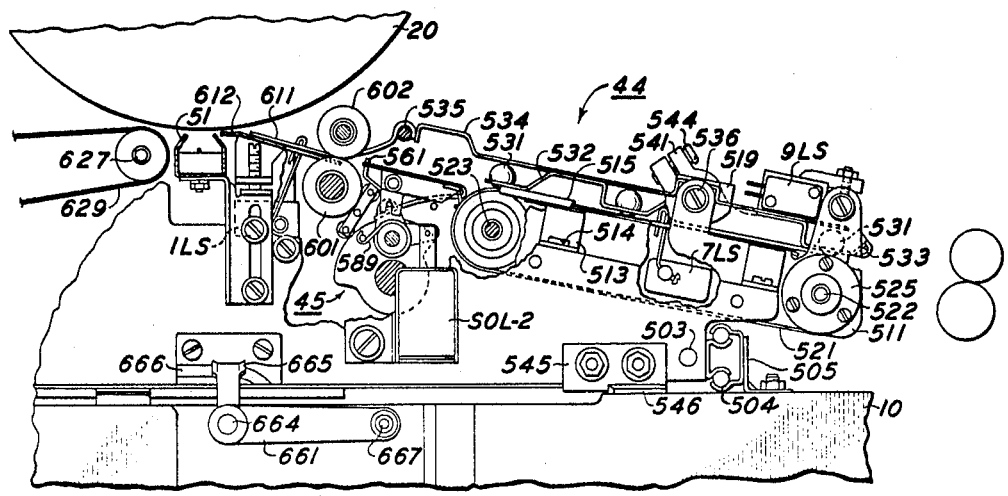
FIG. 4 is a view similar to FIG. 3 with parts broken away to show the elements of the transport mechanism including the paper reject mechanism and the paper registering mechanism.

This entire assembly is locked into operative relation with the xerographic drum by manual operation of lever arm 661. Lever arm 661 is fixed to one end of shaft 664 journaled by bearings 662 and 663 positioned in base plate 10, a cam follower 665 being secured to the opposite end of the shaft to engage cam 666 secured to outboard frame 501. With the lever arm 661 in the position, as shown in FIG. 3, the assembly is properly located in operative position by engagement of cam follower 665 with cam 666. The lever arm, is locked in this position by engagement of ball detent 668 with the knob 667 fixed to the opposite end of lever arm 661 from shaft 664. Ball detent 668 is supported by detent holder 671 threaded into base plate 10 and is biased into engagement with knob 667 by spring 672 positioned within the recessed portion of detent holder 671.

Assuming that only a single sheet has been advanced by the sheet feed device 40, the cam actuated count pulse limit switch 7LS will be actuated to complete a circuit through the normally closed contact 6LSB of no count switch 6LS and by momentarily closed count switch 8LS to energize counter 3TR connected in parallel with a billing counter M-1.

In the event that a double sheet is fed instead of a single sheet by the sheet feed device 40, the multiple sheet sensing switch 9LS will be actuated by the previously described multiple sheet detecting device, which senses the thickness of more than one sheet advanced by sheet feed device 40 to paper transport 44. As limit switch 9LS is closed, it will through reject limit switch 10LS, which is timed to be closed at this time, close a circuit to solenoid SOL-2.

As solenoid SOL-2 is energized, its plunger will contact the actuator of no count limit switch 6LS to close its contact 6LSA to lock in the circuit to solenoid SOL-2. In addition, normally closed contact 6LSB is opened to prevent counting by opening the billing counter M-1 and the counter 3TR circuits. In addition, the plunger of solenoid SOL-2 is linked mechanically to a reject gate, previously described, to deflect the superimposed sheets from the normal paper path thereby ejecting these sheets into the catch tray. Operation of the reject switch 10LS is so timed that it will open again before the following sheet advanced by the sheet feed device 40 arrives at the multiple sheet sensing device on paper transport 44.

While the invention has been described with reference to the structures disclosed herein, it is not confined to the details set forth, and this application is intended to cover such modifications or changes as may come within the purposes of the improvements or the scope of the appended claims:

What is claimed:
1. A multiple sheet detecting device for use in a sheet feeding mechanism having a conveyor to forward sheets, said multiple sheet detecting device including
    a first support rod,
    a second support rod, an adaptor arm pivotally secured at one end to said first rod, adjusting means positioned to adjustably coact between the opposite end of said adaptor arm and said second support rod to define the spaced relation between said elements, a pivot arm pivotally secured at one end to said adaptor arm adjacent said second rod, a limit switch secured to said adaptor arm in position to be actuated by the free end of said pivot arm, and a sheet sensing roller rotatably mounted on said pivot arm to coact with said conveyor to gauge the thickness of sheets passing therebetween.

2. A multiple sheet detecting device for use in a sheet feeding mechanism having a conveyor, and a sheet separating device to forward sheets to said conveyor, said multiple sheet detecting device including a first support rod, a second support rod, an adaptor arm adjustably pivotally secured at one end to said first rod, and having at its opposite end a bifurcated portion adapted to partially encircle said second support rod, adjusting means adjustably connected to opposite ends of said bifurcated portion in position to contact said second support rod, a pivot arm pivotally secured at one end to said adaptor arm adjacent said bifurcated portion, a limit switch secured to said adaptor arm in position to be actuated by the free end of said pivot arm, and a sheet sensing roller rotatably mounted on said pivot arm intermediate its ends, said sheet sensing roller thereby being positioned to coact with said conveyor to gauge the thickness of sheets passing therebetween and in the presence of superposed sheets on said conveyor to rotate said pivot arm sufficiently to actuate said limit switch.

References Cited by the Examiner
UNITED STATES PATENTS

| | | | |
|---|---|---|---|
| 1,701,861 | 2/1929 | Niblack | 271—57 |
| 2,318,132 | 5/1943 | Welk | 271—57 X |
| 2,357,850 | 9/1944 | Reid | 271—57 X |
| 2,393,614 | 1/1946 | Curtis | 271—57 X |
| 2,670,954 | 3/1954 | Bach | 271—57 |
| 3,158,369 | 11/1964 | Blenner et al. | 271—57 |

M. HENSON WOOD, JR., *Primary Examiner.*

A. N. KNOWLES, *Assistant Examiner.*